No. 717,250. Patented Dec. 30, 1902.
L. C. McLOUTH, H. J. HAYES & J. H. WISSMAN.
VEHICLE BODY.
(Application filed Apr. 22, 1901.)
(No Model.) 3 Sheets—Sheet 1.
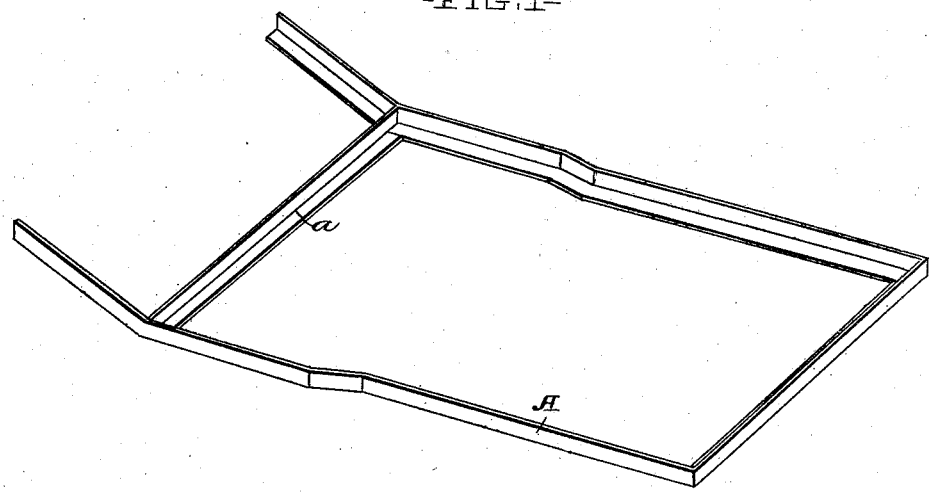
-FIG. I-
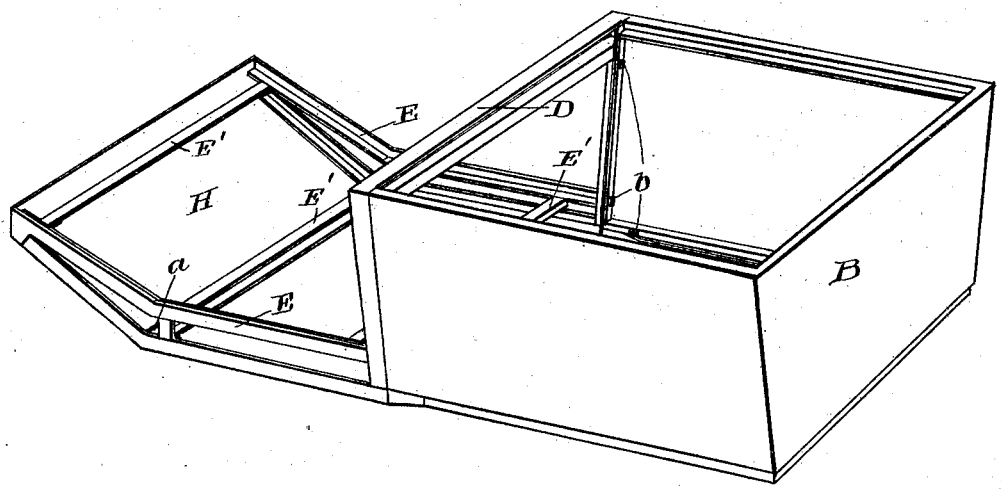
-FIG. II-
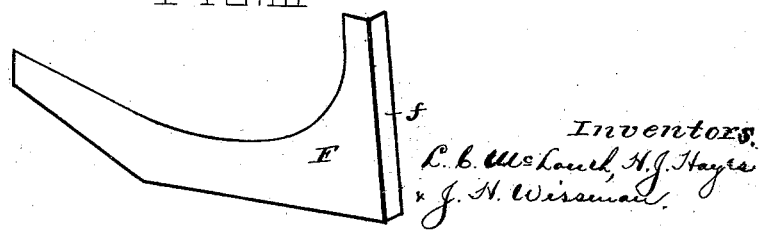
-FIG. III-
Witnesses,
J. C. Turner
A. E. Merkel.
Inventors,
L. C. McLouth, H. J. Hayes
& J. H. Wissman,
By J. D. Fay
Atty.

No. 717,250. Patented Dec. 30, 1902.
L. C. McLOUTH, H. J. HAYES & J. H. WISSMAN.
VEHICLE BODY.
(Application filed Apr. 22, 1901.)
(No Model.) 3 Sheets—Sheet 2.
FIG. IV.
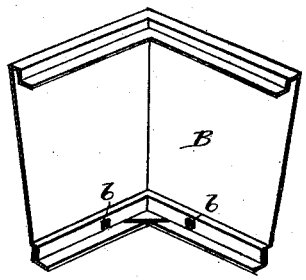
FIG. V.
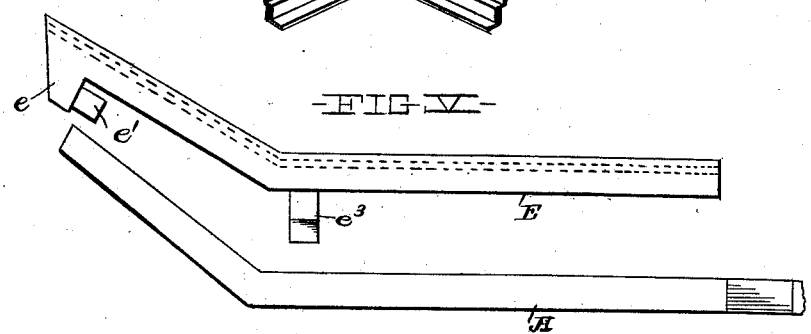
FIG. VI.
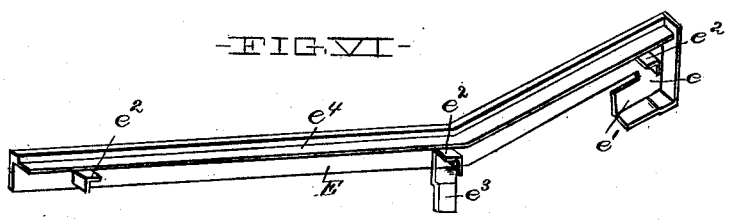
FIG. VII.
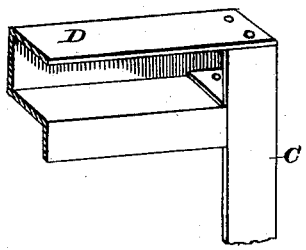
Witnesses,
J. C. Turner
A. E. Merkel.
Inventors
L. C. McLouth, H. J. Hayes,
& J. H. Wissman
By J. D. Fay Atty.
THE NORRIS PETERS CO., PHOTO-LITHO., WASHINGTON, D. C.

No. 717,250. Patented Dec. 30, 1902.
L. C. McLOUTH, H. J. HAYES & J. H. WISSMAN.
VEHICLE BODY.
(Application filed Apr. 22, 1901.)
(No Model.) 3 Sheets—Sheet 3.
- FIG. VIII -
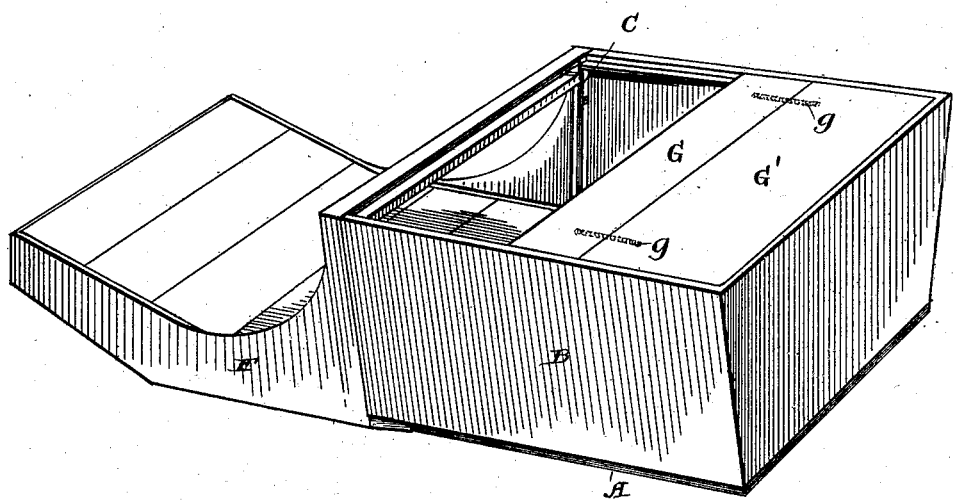
- FIG. IX -
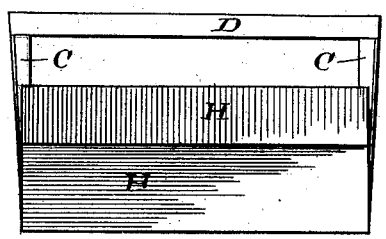
- FIG. X -
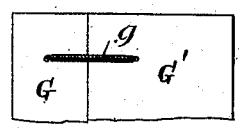
Witnesses,
J. C. Turner
A. E. Merkel.
Inventors
L. C. McLouth, H. J. Hayes
& J. H. Wissman.
By
J. B. Fay
Atty.

UNITED STATES PATENT OFFICE.

LEWIS C. McLOUTH, HECTOR J. HAYES, AND JOE H. WISSMAN, OF CLEVELAND, OHIO, ASSIGNORS TO THE EASTMAN AUTOMOBILE COMPANY, OF CLEVELAND, OHIO, A CORPORATION OF WEST VIRGINIA.

VEHICLE-BODY.

SPECIFICATION forming part of Letters Patent No. 717,250, dated December 30, 1902.

Application filed April 22, 1901. Serial No. 56,860. (No model.)

*To all whom it may concern:*

Be it known that we, LEWIS C. McLOUTH, HECTOR J. HAYES, and JOE H. WISSMAN, citizens of the United States, and residents of Cleveland, county of Cuyahoga, and State of Ohio, have invented new and useful Improvements in Vehicle-Bodies, of which the following is a specification, the principle of the invention being herein explained and the best mode in which we have contemplated applying that principle, so as to distinguish it from other inventions.

Our invention relates to metallic vehicle-bodies, its object being to provide a structure which shall combine in the most advantageous manner incombustibility, rigidity, strength, and susceptibility to ready repair and replacing of parts with economy of structure.

Said invention consists of means hereinafter fully described, and specifically pointed out in the claims.

The annexed drawings and the following description set forth in detail one mode of carrying out our invention, the described means, however, constituting but one of various mechanical forms in which the principle of the invention may be used.

In said annexed drawings, Figure I represents a perspective view of the base-frame utilized in our said invention. Fig. II represents a perspective view of a vehicle-body embodying our said invention, the forward side panels and covering for the rear or box portion of the body being, however, removed. Fig. III represents a perspective view of one of said forward side panels. Fig. IV represents a perspective view of a part of the rear body portion of the body, showing also a part of the base-frame, to which the sides and rear panels are attached. Fig. V represents a side elevation of one of the forward side bars and the forward part of the base-frame to which it is attached. Fig. VI represents a perspective view of such side bar as viewed from the inside. Fig. VII represents a perspective detail view of a part of the front of the rear portion of the body. Fig. VIII represents a perspective view of a complete vehicle-body embodying our invention. Fig. IX represents a front view thereof, and Fig. X represents a detail view.

A lower three-sided base-frame A is formed of angle-iron having the interior angle upon the inner and upper sides thereof. The forward portion of such frame is bent upwardly, as shown in Fig. I, and forms the base of the foot-rest portion of the vehicle-body. A brace *a*, constructed of angle-iron, is secured, preferably by brazing and riveting, to such forward portion for the purpose of imparting rigidity thereto. To the rear portion of such frame is secured a body portion B, forming the side and rear panels of the body. Such body portion is formed of a continuous piece of sheet metal, and its lower edge portion is given an angular formation, as shown in Fig. IV, having its interior angle upon the outside. The lower member of such angular portion is secured to the inside of the base-frame by means of stove-bolts *b*, passing through suitable apertures formed in the base and body portions. Such construction permits said body portion to slightly overlap the base portion, as shown in Fig. VIII, thereby imparting a neat box-like structure thereto. The upper edge of said body portion B is angularly flanged, as shown in Fig. IV, for receiving the seat and panels for covering the top. The front edges of said body portion are secured to two upright metal angle-pieces C, and to the top of such uprights and extending between them is secured a transverse channel-piece D for bracing the structure at this point. The upper surface of such cross-brace D is caused to be flush with the upper surface of the body portion B, as shown in Fig. II. At the points contiguous to the forward end of the body portion B the base-frame A is bent, so as to increase its width, as shown in Fig. I. Two side bars E (a right and a left, the left bar being illustrated in Fig. VI) are secured at their inner ends to the uprights C and at their outer ends to the forward ends of the base-frame, as shown in Fig. II. A downwardly-extending lug *e*, Figs. V and VI, is formed upon the outer end of each such side bar, upon which is formed a rearwardly-extending lug $e'$, inset so as to receive the end of the corresponding base-frame extremity in a manner such as to cause the lateral surfaces to be flush with each other, as shown in Fig. II. Upon the inside of each of said bars are secured a series of angle-lugs $e^2$, upon which are secured cross-braces E'. (Shown in Fig. II.) A downwardly-extending lug $e^3$ is secured to each side bar, as shown in Fig. VI, its lower extremity being secured to the base-frame, as shown in Fig. II, whereby the side bars are vertically braced at such points. Side panels F, Fig. III, constructed of thin sheet metal, are secured one on each side to the forward portion of the base-frame and to the side bars, each such panel being preferably provided with an inwardly-extending portion $f$, which may be secured between the upright C and the adjacent end of the rear body portion, as shown in Fig. VIII. Each side bar is formed with an inwardly-extending ledge $e^4$, which serve as a support for flooring placed in such forwardly-extending portion of the body. The bottom of such forward portion is covered with a metal sheet H, which extends upwardly and across between the two lugs $e$ of the side bars, as shown in Fig. IX. In the top of the body portion and in the rear of that portion thereof occupied by the seat is secured upon the ledge formed at the top of the side panels a cross-panel G, to which is hinged a lid G'. The hinges for such lid are composed, respectively, of two springs $g$, the ends of which are respectively secured to the lower surface of the cross-panel G and the lid G', as shown in Fig. X. These springs permit the lid to be lifted and at the same time maintain a continuous contact when closed with the body portion, whereby objectionable rattling of such lid is prevented.

The vehicle-body constructed as above described embodies a high degree of lightness and strength, and the arrangement is such that parts may be removed without dismantling the whole structure and duplicate parts readily substituted in place therefor.

Other modes of applying the principle of our invention may be employed instead of the one explained, change being made as regards the mechanism herein disclosed, provided the means stated by any one of the following claims or the equivalent of such stated means be employed.

We therefore particularly point out and distinctly claim as our invention—

1. In a vehicle-body, the combination with a lower base-frame constructed from a continuous piece of angle-iron, of a continuous metal sheet having its lower edge secured to said frame and forming the sides and rear of said body.

2. In a vehicle-body the combination with a lower base-frame constructed from a continuous piece of angle-iron and forming the lower lateral and rear edges of said body, of a body portion constructed from a continuous integral metal sheet having its lower edge secured to the lateral and rear portions of said frame.

3. In a vehicle-body, the combination with a lower base-frame formed of angle-iron having the interior angle upon the inside, of a body portion formed of sheet metal forming the sides and rear of said body portion, such sheet metal having its lower edge portion angularly formed, such angularly-formed portion being secured to said base-frame.

4. In a vehicle-body, the combination with a lower base-frame formed of angle-iron having the interior angle upon the inside, of a body portion formed of sheet metal having its lower edge portion angularly formed, such angularly-formed portion having its interior angle upon the outside and secured to the rear portion of said base-frame, whereby said body portion is caused to overhang said base-frame.

5. In a vehicle-body, the combination of a lower base-frame formed of angle-iron bent at its forward portion to form a foot-rest base, a sheet-metal body secured to the rear portion of said frame, two side bars secured to the forward portion of said frame and forming the base for the sides of the forward portion of the body, and sheet-metal panels secured to such side bars, forward frame portion and front portion of said body portion.

Signed by us this 13th day of April, 1901.

LEWIS C. McLOUTH.
HECTOR J. HAYES.
JOE H. WISSMAN.

Attest:
D. T. DAVIES,
A. E. MERKEL.